C. F. MARSTON.

REAR END SIGNAL FOR VEHICLES.

APPLICATION FILED AUG. 18, 1915.

Reissued Jan. 4, 1916.

14,041.

2 SHEETS—SHEET 1.

WITNESSES

Frank C. Palmer

E. Mundock

INVENTOR

Charles F. Marston

BY Munn & Co

ATTORNEYS

C. F. MARSTON.

REAR END SIGNAL FOR VEHICLES.

APPLICATION FILED AUG. 18, 1915.

Reissued Jan. 4, 1916.

14,041.

2 SHEETS—SHEET 2.

WITNESSES

Frank C. Palmer

E. B. Mundock

INVENTOR

Charles F. Marston

BY Munn & Co.

ATTORNEYS

UNITED STATES PATENT OFFICE.

CHARLES F. MARSTON, OF CEDARHURST, NEW YORK.

REAR-END SIGNAL FOR VEHICLES.

14,041. Specification of Reissued Letters Patent. Reissued Jan. 4, 1916.

Original No. 1,095,902, dated May 5, 1914, Serial No. 749,064. Application for reissue filed August 18, 1915. Serial No. 46,199.

*To all whom it may concern:*

Be it known that I, CHARLES F. MARSTON, a citizen of the United States, and a resident of Cedarhurst, in the county of Nassau and State of New York, have invented a new and Improved Rear-End Signal for Vehicles, of which the following is a full, clear, and exact description.

Among the principal objects which the present invention has in view are: To provide a signal of the character mentioned, having means readily operable by the foot of the driver, to selectively actuate signs to indicate his intent; to provide a foot-pedal for controlling the driving mechanism of a vehicle, having mounted thereon a series of electrical contacts for completing operating electric circuits to dispose in view, and selectively, signs or implements to indicate the proposed movement of the vehicle having the signal; and to provide a signal of the character mentioned the construction whereof is simple, durable and efficient.

One embodiment of the present invention is shown in the accompanying drawings, in which—

Figure 1:
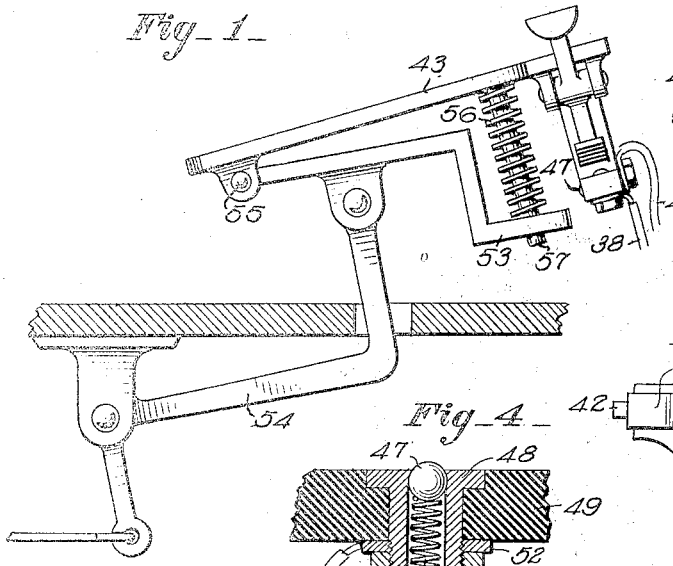
Figure 2:
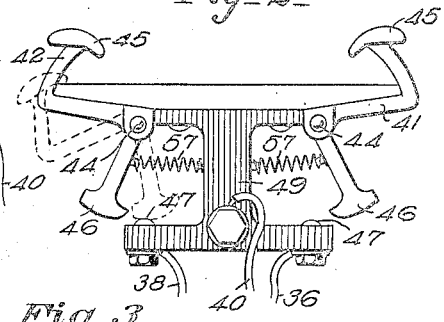
Figure 3:
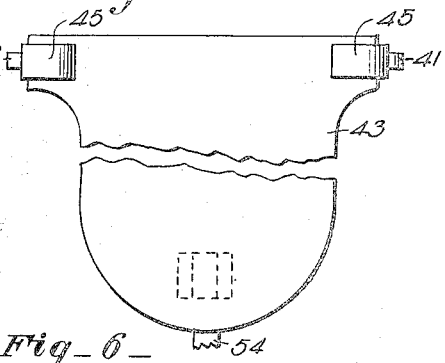
Figure 4:
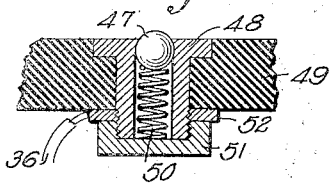
Figure 5:
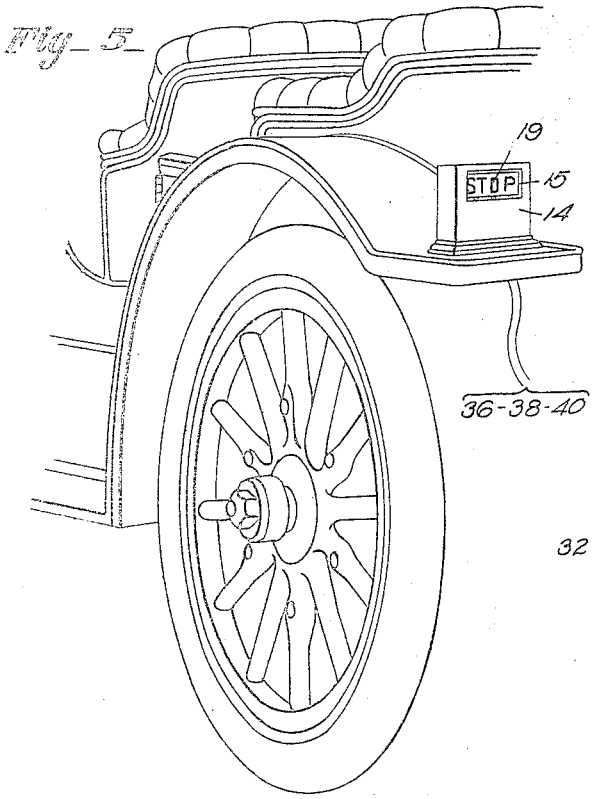
Figure 6:
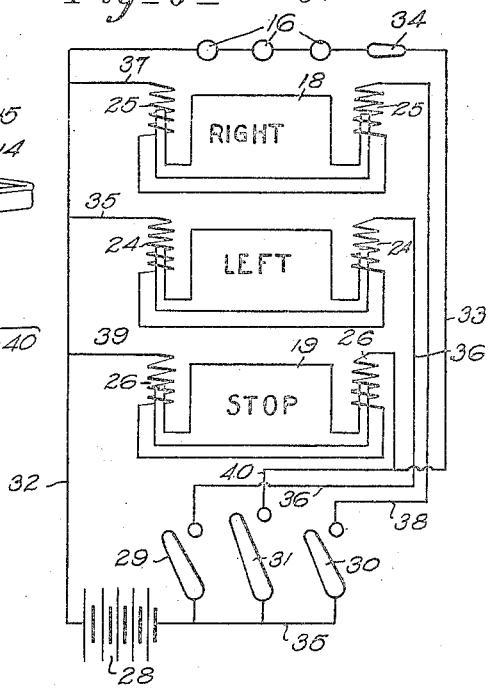
Figure 7:
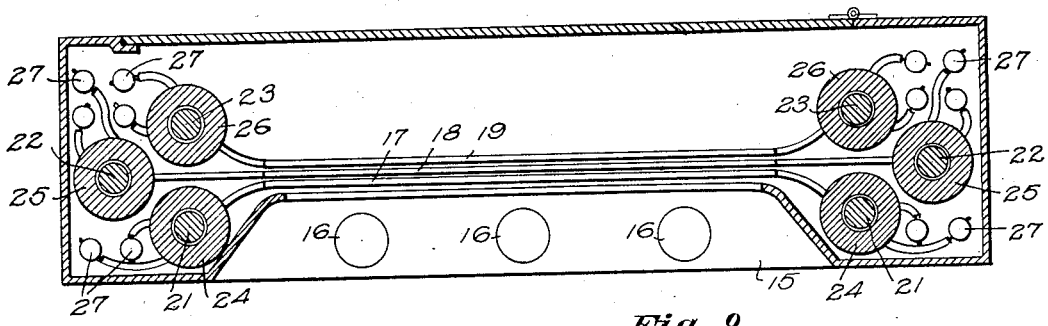
Figure 8:
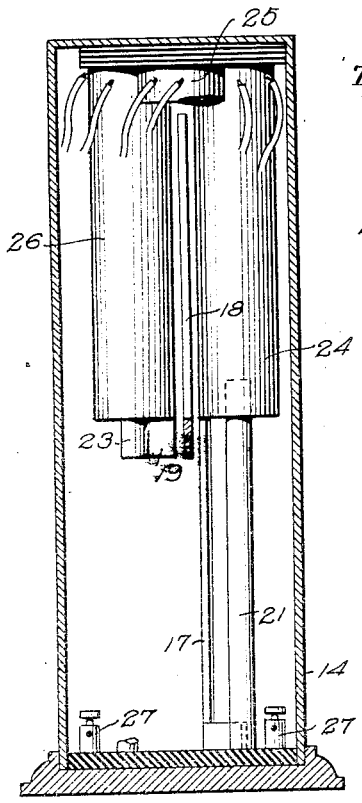
Figure 9:
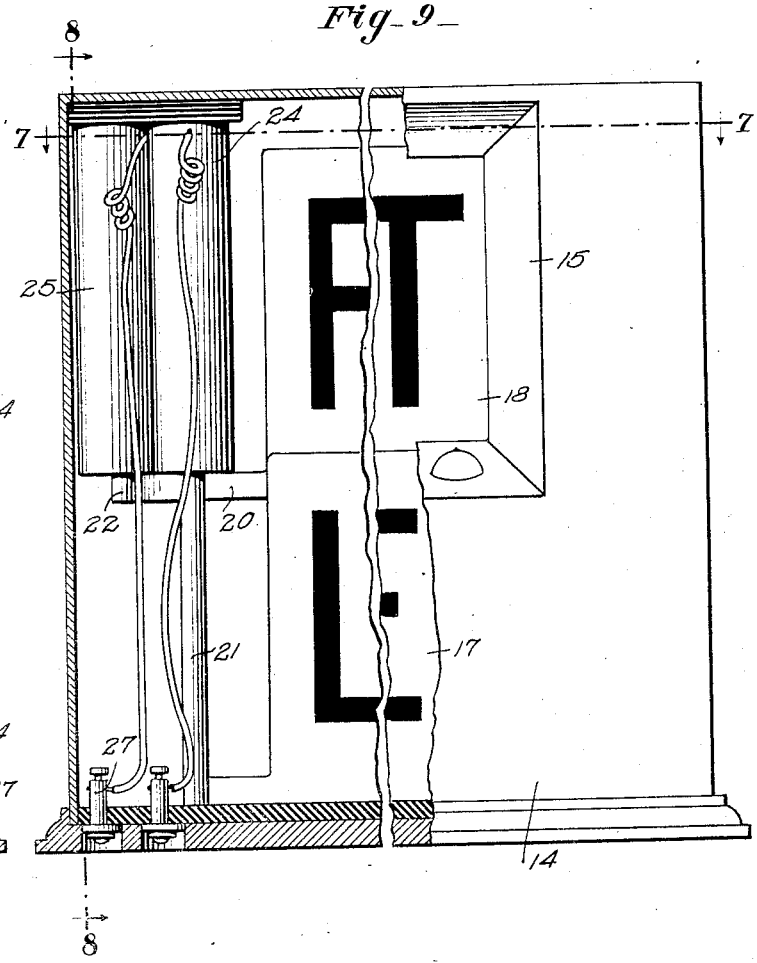

Figure 1 is a sectional elevation showing the side of a foot-pedal-operated controlling lever having electric switches constructed and arranged in accordance with the present invention; Fig. 2 is a front view of the pedal; Fig. 3 is a top view of the same; Fig. 4 is a detail view in section, on an enlarged scale, showing a ball contact for effecting the closure of one of the operating circuits to accommodate a possible excess of movement thereof; Fig. 5 is a pictorial view showing a rear fragment of an automobile having a rear-end signal mounted on the mud-guard thereof, said signal being constructed and arranged in accordance with the present invention; Fig. 6 is a diagrammatic view showing the panels with which the present-described signal is provided, together with the electro-actuated means for operating the same; Fig. 7 is a horizontal section taken on the line 7—7 in Fig. 9; Fig. 8 is a sectional elevation taken on the line 8—8 in Fig. 9; Fig. 9 is a sectional elevation showing part of the front of the casing of the signal, a portion of the operating panels thereof, and one side of the battery of electro-mechanical devices for controlling said panels.

As best seen in Fig. 5 of the drawings, the signal is mounted in a case 14. The case 14 is provided with a view opening 15, the sides of which are beveled, and the lower side of which is pierced to form receptacles for electric lamps 16. The lamps 16 serve to illuminate when signaling the view opening 15 and the panels disposed therein.

The panels referred to are three in number, and are nested, as best seen in Fig. 7 of the drawings. Said panels are here designated by the numerals 17, 18 and 19. The panel 19 is that upon which is usually placed the word "Stop", and is relatively the rearmost of the three panels herein disclosed. The other panels, numbers 17 and 18, are each provided optionally with one of the words "Left" and "Right". Each of the panels is connected by means of laterally extended arms 20, with one of the core rods 21, 22 and 23. The rods 21, 22 and 23 are constructed of soft iron to form a core for solenoids 24, 25 and 26 respectively. The solenoids 24, 25 and 26 are duplicated and arranged in pairs one part of each pair being located at the opposite ends of the case 14. The solenoids 24, 25 and 26 are suitably connected with binding posts 27, and are incorporated in one of the circuits formed by a battery 28 and switches 29, 30 and 31 respectively. The general circuit forming a part of each of the individualized circuits comprises the main 32, and a common return 35.

When a switch 34 on the branch wire 33 is closed, the lamps 16 are illuminated coincidently with the lift of the panel 19. The panel 19 is lifted either independently or in conjunction with each of the panels 17 and 18. As the panel 19 is operated for each signal, the lamps 16 are illuminated for each signal. The lamps 16 are employed only at night when artificial light is used for eliminating the signal panels. During the day to economize the electric current the switch 34 is opened, which darkens the lamps 16 without disturbing the individual circuits operating the various panels. The individual circuits for operating the panels are respectively controlled by the switches 29, 30 and 31, selectively and successively.

When the switch 29 is closed, the solenoids 24 are energized, the current flowing therethrough by way of the main 32 and branch wires 35 and 36. Likewise, when the switch 30 is closed, the solenoids 25 are energized, the current flowing through the main

BEST AVAILABLE COPY 32 and branch wires 37 and 38, resulting in lifting the panel 18 carrying the word "Right". In like manner, the solenoids 26 are energized when the switch 31 is closed, the current then passing from the main 32 through said solenoids by way of branch wires 39 and 40.

The numerals 29, 30 and 31 in the diagram shown in Fig. 6 have been assigned to pivoted switch members. In practice the movable switch members 29 and 30 are the pivoted levers 41 and 42. The levers 41 and 42 are each pivoted upon a foot plate 43, pins 44 serving as pivots. The upper ends of the levers 41 and 42 are each provided with foot pads 45, which in the construction are spaced apart more than the normal width of the sole of a man's shoe, the idea being that when operating one of the levers 41, 42, the driver cannot operate the other lever, and to provide that the driver may depress the plate 43 without operating either lever 41 or 42. The lower ends of the levers 41 and 42 are provided with wiper heads 46. The heads 46 swing over ball contacts 47, which, as shown in Fig. 4 of the drawings, are mounted in metal sockets 48 extending through the insulated bracket 49. The bracket 49 is bolted, as shown best in Fig. 2, of the drawings, to the under side of the plate 43.

Each of the balls 47 is extended from the opening of the socket 48 by springs 50. The lower end of each of the sockets 48 is closed by a cap nut 51. This construction is best seen in Fig. 4 of the drawings. Each of the cap nuts 50 bears upon one of the terminal washers 52. Each of the washers 52 is connected with one of the branch wires 36, 38 and 40 incorporated in the operating circuits for the panels 17, 18 and 19. The socket 48 and ball 47 thereof which is connected with the branch wire 40 and corresponds with the switch 31 shown in Fig. 6 of the drawings, is so arranged in the bracket 49 that the ball 47 impinges upon and rolls over the edge of the pedal frame 53 which is suitably mounted on the lever 54 employed for controlling the driving mechanism of the vehicle, whether brake or clutch lever control. The plate 43 is pivotally connected with the frame 53 by a hinge pin 55, and is supported in separated relation to said frame by a spiral spring 56. To guide the plate 43 the same is provided with a guide pin 57 extending through a depressed portion of the frame 53 and serving as a holding member for the spring 56.

When an automobile is equipped with a signal device and operating means therefor, constructed and arranged as above described, the operation thereof is as follows: It is obvious that whenever the driver presses upon the plate 43 to rock the lever 54 for controlling the automobile, said plate is depressed upon the frame 53, the spring 56 yielding to permit this. Each time a signal is operated, the plate 43 is depressed so that the ball 47 connected with the wire 40 engages the frame 53 which constitutes a part of the operating circuits of the signals, and is the equivalent of the wire 35 in the diagram shown in Fig. 6 of the drawings. The balls 47 which are connected with the wires 36 and 38 complete the operating circuit for the signals through the same elements, the frame 53 and lever 54 electrically connected therewith. It will be noted that the levers 41 and 42 are electrically connected with the plate 43, and through said plate with the frame 53 and said levers. It will be understood that the lever 54 and parts connected therewith are metallically connected with the electrical source, such as the battery 28 indicated in Fig. 6 of the drawings, and that said parts united constitute the equivalent of the wire 35 in said diagram.

The wire 40, as described, and as shown in the diagram Fig. 6, is incorporated in the circuit having the solenoids 26, which, when energized, lift the panel 19 carrying thereon the word "Stop". For every operation of the signal where the plate 43 is depressed it will be understood, the circuit having the solenoids 26 to lift the panel 19, is closed and said panel is lifted. If the operator desires to indicate an intention to turn to the right of left, he places his foot on the pad 45 of the lever 42 or the lever 41, as the case may be. If the lever 42 is rocked on its pivot, the wiper head 46 thereof closes the circuit embodying the wires 38 and solenoids 25. The solenoids 25 lift the panel 18 having thereon imprinted the word "Right". It will be understood that the panel 18, being lifted, conceals the panel 19 which is behind the panel 18 in the arrangement provided in the case 14, as seen in Fig. 7 of the drawing. If it is the intention to turn to the left the foot is shifted to operate the lever 41, and in doing this, the lever 42 is released, permitting a spring 57 to swing the wiper head out of contact with the ball 47 thereby breaking the circuit embodying the wire 38 and the solenoids 25 previously operating to elevate the panel 18.

It will be understood that while the spring 56 has sufficient strength to lift the plate and parts connected therewith, it has not sufficient strength to operate the lever 54 and parts connected therewith. The result of this construction is that the plate 43 may be depressed to operate the rear end signal without operating the lever 54. This enables the driver to indicate to a following vehicle his intention, prior to his operation of the lever 54.

It will be observed that whenever the pressure of the driver's foot is removed from the plate 43, or shifted to the rear end there the spring 56 lifts said plate and the various circuits are thereby opened, thus avoiding the difficulty arising from neglect of the driver to change his signals after having operated the car in accordance therewith.

Having thus described my invention, I claim as new and desire to secure by Letters Patent:

1. In combination with an automobile-operating foot-pedal, a foot-plate movably mounted on said pedal, to be depressed by the foot of the operator toward said pedal, a signal embodying direction indicating members and electro-mechanical devices for operating the same, and an electric current supply for said electro-mechanical devices embodying switch members, one of which is supported by said plate to be moved therewith into contact with said pedal.

2. In combination with an automobile-operating foot-pedal, a foot plate movably mounted on said pedal to be depressed by the foot of the operator toward said pedal, a signal embodying direction indicating members and electro-mechanical devices for operating the same, an electric current supply for said electro-mechanical devices embodying switch members, one of which is supported by said plate to be moved therewith into contact with said pedal, and a plurality of swinging switch members mounted on said plate, the depression whereof selectively actuates said electro-mechanical devices.

3. In combination with an automobile-operating mechanism having a foot-pedal, a foot-plate movably mounted on said pedal to be depressed by the foot of the operator toward said pedal, a signal, embodying a plurality of movable panels and electro-mechanical devices for operating to expose the same, means for normally concealing said panels, an electric current supply for said electro-mechanical devices, embodying switch members, one of which is supported by said plate, to be moved therewith into contact with said pedal, and a plurality of swinging switch members mounted on said plate, operably disposed to the foot of the driver, the depression whereof selectively actuates said electro-mechanical devices, said switch members being spaced apart to avoid being operated simultaneously by the foot of the driver.

4. A signal as characterized comprising a vehicle control pedal, a foot plate yieldingly mounted thereon, a switch mounted on said foot plate to be closed thereby, a plurality of foot pads yieldingly mounted on said plate, and a plurality of switches mounted on said plate, said switches being operable by said pads.

5. A signal as characterized comprising a vehicle control pedal, a foot plate yieldingly mounted thereon, a switch embodying said pedal and said plate, a plurality of foot pads yieldingly mounted on said plate, selective switches embodying said pads and said plate, a signal having direction indicating members, and a transmission mechanism operatively connecting said switches and said direction indicating members.

In testimony whereof I have signed my name to this specification.

CHARLES F. MARSTON.